No. 616,711. Patented Dec. 27, 1898.
A. D. LANE.
SAWMILL DOG.
(Application filed Feb. 26, 1898. Renewed Nov. 29, 1898.)
(No Model.)
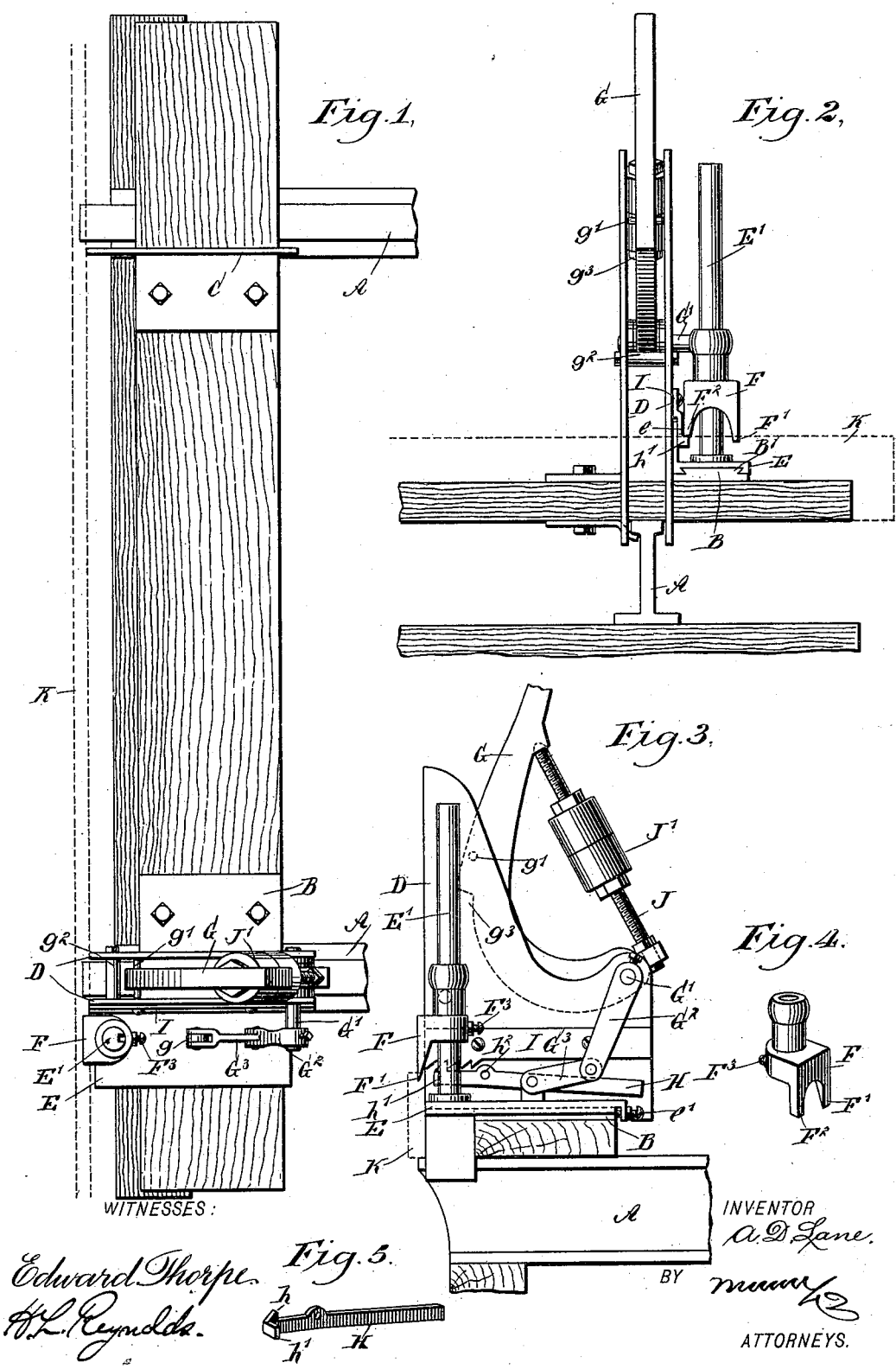

UNITED STATES PATENT OFFICE.

ALBERT DENNIS LANE, OF MONTPELIER, VERMONT.

SAWMILL-DOG.

SPECIFICATION forming part of Letters Patent No. 616,711, dated December 27, 1898.

Application filed February 26, 1898. Renewed November 29, 1898. Serial No. 697,805. (No model.)

*To all whom it may concern:*

Be it known that I, ALBERT DENNIS LANE, of Montpelier, in the county of Washington and State of Vermont, have invented a new and Improved Sawmill-Dog, of which the following is a full, clear, and exact description.

My invention relates to an improvement in sawmill dogs or devices for holding a log or stick of timber upon the carriage while it is being sawed; and it consists of certain novel features of construction, which will be hereinafter described and claimed.

Reference is to be had to the accompanying drawings, forming a part of this specification, in which similar characters of reference indicate corresponding parts in all the views.

Figure 1 is a top plan view of a portion of a carriage, showing my device attached thereto. Fig. 2 is a front elevation of one of the knees of the carriage with the dog applied thereto. Fig. 3 is an end elevation of the same. Fig. 4 is a perspective view showing the dog proper, and Fig. 5 is a perspective view showing the catch by which the dog is retained projected.

The object of my invention is to provide a dog for holding the timber upon the carriage of such nature that the stick may be cut down to a very narrow thickness and which may be disengaged by the attendant without approaching the saw and also without marring or injuring the last board. These results have been secured by the mechanism hereinafter described.

The cross-beams A form a part of the carriage upon which the knees are moved toward and from the saw. These knees may be of any ordinary construction, and the dog is to be applied to that end of the carriage which is toward the saw after the board has been cut. The dog may be applied to the opposite end of the carriage, but the position referred to is the preferred one. It may also be applied to both ends, but it is thought not necessary to apply it to more than one end.

The knee C at one end of the carriage is an ordinary knee. The knee D at the other end is constructed of two plates, which are held a short distance apart and between which the operating-lever G works. Upon the base B, which is attached to the carriage, is formed a guide B', which, as herein shown, is of a V or dovetail form. Upon this guide is mounted a plate E, which is adapted to reciprocate across the carriage or toward and from the cutting edge. This plate at its forward end supports a vertical guide E', which, as herein shown, consists of a round bar provided with a groove upon one side. This bar should be so constructed as to form a guide for the rise and fall of the dog and yet prevent its revolution thereon.

The dog F consists of a block having two teeth extending downward from the outer edge thereof, the tooth F' being longer than the tooth $F^2$ and sharpened at its end, while the tooth $F^2$ is rounded or blunted. The tooth $F^2$ is intended to rest upon the top of the timber without entering the same, while the tooth F' is intended to enter the timber a sufficient distance to hold the same securely. This block is provided with a pin and set-screw $F^3$, the end of which enters the groove in the guide E' and prevents the block from turning.

The operating-lever G is pivoted between the rear edges of the plates forming the knee D, the pin or shaft G', upon which it is pivoted, extending through one of the plates and having a lever $G^2$ secured to the outer end thereof. This shaft G' is securely fixed both to the lever $G^2$ and the operating-lever G, thus acting as a rock-shaft. The lower end of the lever $G^2$ is secured by a link $G^3$ to a lug $g$ upon the upper side of the sliding plate E. By swinging the lever G forward or back the plate E will be moved, so as to project the dog F into engaging position or withdraw it back of the outer edges of the knee. The plate E has a web or plate $e$ extending upward from one side thereof close along the side of one plate D forming the knees. The upper edge of this plate $e$ is secured beneath a plate I, which is fastened to the outer side of the knee, thus forming a retaining-guide therefor. The under surface of the plate I at its outer end is formed with a number of notches or ratchet-teeth.

Upon the plate $e$ is pivoted a latch H by the pivot $h^2$. The outer end of the latch H is provided with a tooth $h$, adapted to engage the teeth upon the plate I. The pivot-point of the latch H is so placed that it will normally be held so as to engage the tooth $h$ with the teeth upon the plate I. At the toothed end of the latch H is a side-extending arm or lug h' so located as to be engaged by the dog F when the latter is dropped to its lowest position. The operating-lever G is so hung that its weight tends to draw the slide E and the dog F carried thereon back from the outer edge of the knee. The tooth h upon the latch H, engaging the teeth upon the plate I, serves to hold the plate E and the dog F in their outer positions. As soon as the latch H is released by dropping the dog F to its lowest position the slide E and the dog F will be withdrawn.

To regulate the amount of force acting to withdraw the dog F, a threaded bar J is provided upon the operating-lever G, and upon this bar J is fixed a weight J', which may be adjusted to any position upon the bar or rod, and thus regulate the amount of overhang, and consequently the force applied to withdraw the slide. To regulate the exact position of the slide when projected, a set-screw e' is passed through a downwardly-extending ear upon the rear end of the slide E and made to contact with the end of the plate B upon which the slide is mounted. By regulating the position of this set-screw the exact location of the dog F when projected may be controlled.

The two plates D forming the knee are connected by a bolt or pin $g^2$ so located as to be engaged by a shoulder $g^3$ upon the operating-lever G, and thus to support the weight of the lever when the dog is withdrawn. This also prevents the operating-lever from being thrown beyond the outer edges of the knee. The operating-lever G is also provided with a pin g', projecting from each side thereof and engaging the inner surfaces of the plates D.

My device is used as follows: When the log has been squared ready for sawing boards, the dog F is raised by one hand and the operating-lever G drawn back with the other. This throws the dog outward into position to engage the timber. It is then forced downward until the point F' enters the timber and secures it in place. The device has been adjusted to such a point that the projection of the dog beyond the face of the knee is less than the thickness of the last board. When the timber has been sawed down until nothing but this last board remains, this is removed from the carriage by the attendant grasping the end which is farthest removed from the dog F. By raising this end vertically the point F' is withdrawn from the edge of the plank. In this action the blunt or rounded tooth $F^2$ acts as a fulcrum to withdraw the tooth F'. When the tooth F' has been withdrawn, the plank may be tipped to one side, thus permitting the dog F to drop. As it drops it comes in contact with the projecting lug h' upon the latch H. This releases the slide E and permits it to be withdrawn under the influence of the weighted operating-lever G. Removing the dog in this manner prevents the splitting of the timber, and consequently spoiling the last board. It also makes it entirely unnecessary for the attendant to get near the saw, and is thus liable to prevent accidents.

Having thus described my invention, I claim as new and desire to secure by Letters Patent—

1. A sawmill-dog, having two teeth disposed longitudinally of the carriage, one of said teeth being sharpened and longer than the other, said other tooth having a flat or blunt end, substantially as described.

2. A sawmill-dog, adapted to slide on a vertical guide, and having two teeth disposed longitudinally of the carriage, one of said teeth being sharpened and longer than the other, said other tooth having a flat or blunt end, and a vertical guide for said dog mounted upon the carriage, substantially as described.

3. A sawmill-dog adapted to slide on a guide and having two teeth disposed longitudinally of the carriage, one of the teeth being sharpened and the other blunted, the sharpened tooth being the longer, a slide mounted to slide across the carriage, and a vertical guide thereon adapted to receive the dog, substantially as described.

4. A sawmill-dog adapted to slide on a guide, and having two teeth disposed longitudinally of the carriage, one of said teeth being sharpened and the other blunt, the sharpened tooth being the longer, and a vertical guide adapted to receive the dog and movable across the carriage, substantially as described.

5. A sawmill-dog adapted to slide on a guide and having two teeth disposed longitudinally of the carriage, one of said teeth being sharpened and the other blunt, the sharpened tooth being the longer, a vertical guide adapted to receive the dog and movable across the carriage, means acting thereon to retract the guide and dog, and a catch adapted to hold the guide and dog projected, substantially as described.

6. A dogging device for sawmill-carriages, comprising a vertical guide mounted upon the knee and having movement thereon toward and from the front of the knee, a dog mounted to slide on the guide, means acting on the guide to retract it, and a catch for holding it projected having a projection adapted to be engaged by the dog, to release the catch when the dog drops to the bottom of the guide, substantially as described.

7. A dogging device for sawmill-carriages, comprising a vertical guide mounted upon the knee and having movement thereon toward and from the front of the knee, a dog mounted to slide on the guide and having two teeth, one pointed and the other blunted, the latter being the shorter, means acting on the guide to retract it, and a catch for holding it projected, having a projection adapted to be engaged by the dog, to release said catch when the dog drops to the bottom of its guide, substantially as described.

8. A dogging device for sawmill-carriages, comprising a vertical guide mounted upon the knee and having movement thereon toward and from the front of the knee, a dog mounted to slide upon the guide, a weighted lever acting upon the guide to retract it, means for shifting the position of the weight on said lever, and a catch for holding the guide projected and adapted to be engaged by the dog in its descent, to release the guide and throw the retracting mechanism into operation, substantially as described.

9. A sawmill-dog, comprising a slide mounted to move across the carriage, an adjustable stop to limit the motion of the slide, a vertical guide mounted on the slide, a dog mounted to slide upon the guide, a lever connected to the slide and normally acting to retract it, and a catch to hold the slide projected and adapted to be engaged and released by the dog at the bottom of its travel, substantially as described.

10. A sawmill-dog, comprising a slide mounted to move across the carriage, an adjustable stop to limit the motion of the slide, a vertical guide mounted upon the slide, a dog sliding upon the guide, a lever connected to the slide and normally acting to retract it, said lever having a threaded member and weights screwing thereon to adjust the pull of said lever, and a catch to hold the slide projected and adapted to be engaged and released by the dog at the lowermost point of its travel, substantially as described.

ALBERT DENNIS LANE.

Witnesses:
   MELVILLE E. SMILIE,
   ERWIN M. HARVEY.